(12) United States Patent
Ell

(10) Patent No.: US 6,469,863 B1
(45) Date of Patent: Oct. 22, 2002

(54) ACTIVE MAGNETIC BEARING SYSTEM FOR IMPROVED SERVO CONTROL

(75) Inventor: Travis E. Ell, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/552,607

(22) Filed: Apr. 19, 2000

Related U.S. Application Data

(60) Provisional application No. 60/130,291, filed on Apr. 21, 1999.

(51) Int. Cl.[7] ............................................. G11B 5/596
(52) U.S. Cl. ............................ 360/78.04; 310/90.05; 360/75
(58) Field of Search .................. 360/265.2–265.6, 360/294.7, 106, 75, 78.04; 310/90.5

(56) References Cited

U.S. PATENT DOCUMENTS

| | | |
|---|---|---|
| 5,003,415 A | 3/1991 | Freeze |
| 5,111,102 A | 5/1992 | Meeks |
| 5,128,812 A | 7/1992 | Uno |
| 5,208,711 A | 5/1993 | Kitamura et al. |
| 5,262,907 A | 11/1993 | Duffy et al. |
| 5,514,924 A | 5/1996 | McMullen et al. |
| 5,808,839 A | 9/1998 | Dunfield et al. |
| 5,907,453 A | 5/1999 | Wood et al. |

FOREIGN PATENT DOCUMENTS

| | | |
|---|---|---|
| EP | 0 819 861 A2 | 1/1998 |
| EP | 0 819 861 A3 | 7/2000 |

OTHER PUBLICATIONS

"Magnetic Bearing Systems Operate in Harsh Environments;" Ronald Kipp and Dr. Joseph Imlach, Monitor Machinery Health, PCIM, Nov. 1992.

Primary Examiner—Andrew L. Sniezek
Assistant Examiner—Mitchell Slavitt
(74) Attorney, Agent, or Firm—Crowe & Dunlevy

(57) ABSTRACT

Apparatus and method for improved servo control in a disc drive. The disc drive includes a rotatable disc, a moveable actuator which supports a head adjacent the disc, and a stationary active magnetic bearing assembly which uses bearing coils to levitate the actuator. An active magnetic bearing control circuit applies currents to the bearing coils, and a servo control circuit applies current to an actuator motor to position the head with respect to the disc. The active magnetic bearing control circuit outputs a disturbance signal when a disturbance affects the relative positioning of the actuator and the bearing assembly, and this disturbance signal is fed forward into the servo control circuit. Conversely, the servo control circuit provides a seek expectancy signal to the bearing control circuit to enable the bearing control circuit to compensate for torque forces applied by the actuator motor.

15 Claims, 10 Drawing Sheets

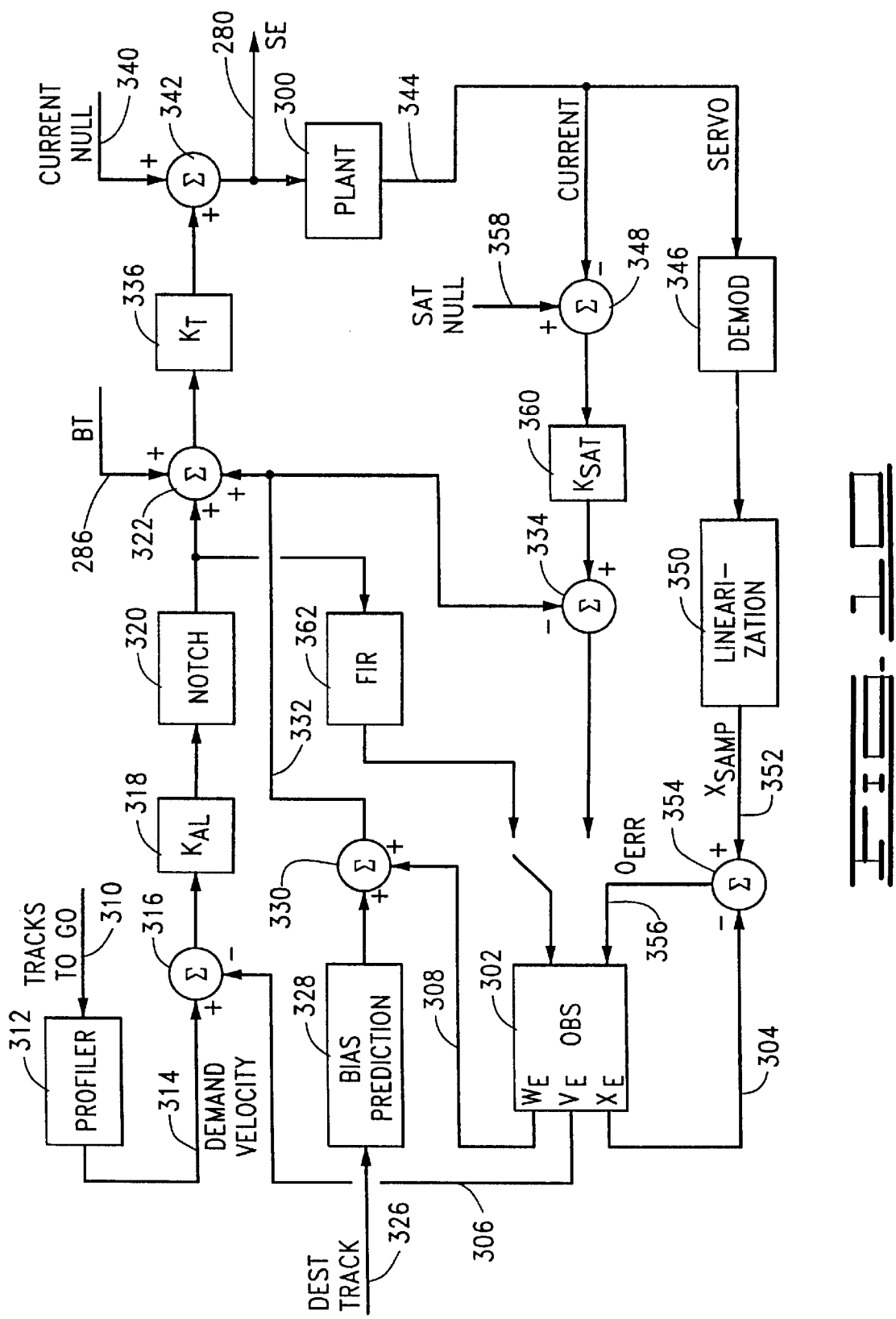

ACTIVE MAGNETIC BEARING SYSTEM FOR IMPROVED SERVO CONTROL

RELATED APPLICATIONS

This application claims priority to U.S. Provisional Application No. 60/130,291 filed Apr. 21, 1999.

FIELD OF THE INVENTION

This invention relates generally to the field of magnetic data storage devices, and more particularly, but not by way of limitation, to optimizing the mechanical configuration of a disc drive to improve operational performance.

BACKGROUND

Disc drives are used as primary data storage devices in modem computer systems and networks. A typical disc drive comprises one or more rigid magnetic storage discs which are journaled about a rotary hub of a spindle motor to form a disc stack. An array of read/write transducing heads are supported adjacent the disc stack by an actuator to transfer data between tracks of the discs and a host computer in which the disc drive is mounted.

Conventional actuators employ a voice coil motor to position the heads with respect to the disc surfaces. The heads are mounted via flexures at the ends of a plurality of arms which project radially outward from an actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of a magnetic circuit comprising one or more permanent magnets and magnetically permeable pole pieces. When current is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces.

The control of the position of the heads is typically achieved with a closed loop servo system such as disclosed in U.S. Pat. No. 5,262,907 entitled HARD DISC DRIVE WITH IMPROVED SERVO SYSTEM issued Nov. 16, 1993 to Duffy et al. (Duffy'907), and assigned to the assignee of the present invention. A typical servo system utilizes servo information (written to the discs during the disc drive manufacturing process) to detect and control the position of the heads through the generation of a position error signal (PES) which is indicative of the position of the head with respect to a selected track. The PES is generated by the servo system by comparing the relative signal strengths of burst signals generated from precisely located magnetized servo fields in the servo information on the disc surface.

The servo system primarily operates in one of two selectable modes: seeking and track following. A seek operation entails moving a selected head from an initial track to a destination track on the associated disc surface through the initial acceleration and subsequent deceleration of the head away from the initial track and toward the destination track. A velocity control approach is used whereby the velocity of the head is repeatedly estimated (based on measured position) and compared to a velocity profile defining a desired velocity trajectory for the seek. Corrections to the amount of current applied to the coil during the seek are made in relation to the difference between the estimated velocity and the desired velocity.

At such time that the head reaches a predetermined distance away from the destination track (such as one track away), the servo system transitions to a settling mode wherein the head is settled onto the destination track. Thereafter, the servo system enters a track following mode of operation wherein the head is caused to follow the destination track until the next seek operation is performed.

Disc drive designs thus typically use proximate time optimal control with a velocity profile to control a selected head during a seek, a state estimator based controller with relatively slow integration to settle the head onto the destination track, and the same state estimator based controller with relatively fast integration for track following.

Conventional disc drive designers have employed ball bearing cartridges for journaling the actuator assembly about the pivot point. These bearing assemblies are subject to very rapid, repetitive movements of the actuator arm about the pivot point as the heads are radially moved from track to track. The precision required by the rotation of the actuator arm about the bearing assembly has significantly increased as the storage capacity of modem disc drives continues to expand.

The precision of seeking and track following operations is dependent upon the performance of the actuator bearing assembly. Conventional ball bearing assemblies are subject to mechanical limitations which adversely affect their use in today's high-performance disc drives. More specifically, conventional ball bearing assemblies are subject to metal wear, increased vibrational resonance and friction, and lubricant out gassing. These problems exacerbate the difficulties experienced in selectively positioning a transducer in disc drives with elevated aerial densities.

Electromagnetic bearing assemblies have been proposed as a solution to these problems. An electromagnetic bearing is a device that supports and controls the position of an object immersed in an actively controlled magnetic field. Electromagnetic bearings reap the obvious benefit of having negligible rotor to stator friction and negligible mechanical abrasion.

Magnetic bearings are highly effective for rotatably supporting a rotor which is effectively floated by a controlled magnetic field established by passive (permanent) or active (electromagnetic) magnets located on the stator. Typically, the magnetic field is controlled by a closed-loop feedback system incorporating inductive sensors and variable electromagnets. U.S. Pat. No. 5,111,102 issued May 5, 1992 to Meeks ("Meeks'102") provides thorough explanation of magnetic bearing assemblies and the closed loop feedback control used to maintain the magnetic suspension.

Magnetic actuator bearing assemblies are known in the art of disc drive design and manufacture. For example, U.S. Pat. No. 5,808,839 issued Sep. 18, 1998 to Dunfield et al. ("Dunfield'839") discloses a magnetic bearing assembly which is mechanically coupled about its axis. Dunfield'839 fails to make use of complete tri-axial levitation, however, and instead just provides two (X–Y) axis suspension. Further, prior art magnetic bearing assemblies fail to relate the magnetic suspension of the actuator to its servo control. Therefore, there is a pressing need to develop a full-floating actuator bearing assembly which beneficially interrelates the controlled actuator levitation to its complex servo control.

SUMMARY OF THE INVENTION

The present invention provides an improved bearing cartridge for pivotally attaching a rotary actuator to the basedeck of a hard disc drive. The improved bearing cartridge also improves servo control of the rotary actuator during seek and track following operations.

In accordance with preferred embodiments, the improved bearing cartridge comprises an active magnetic bearing assembly which three dimensionally suspends the rotary actuator within strictly defined tolerances. The active magnetic bearing assembly preferably comprises a plurality of directional electromagnetic drivers, a plurality of directional permanent magnets and a plurality of sense coils.

The circuitry corresponding to the active magnetic bearing assembly provides a control scheme which enables the active magnetic bearing to detect a disturbance in the actuator and apply corrective current to the proper electromagnetic drivers. The circuitry also provides a feedforward signal indicative of actuator translation to a voice coil motor (VCM) servo control circuit which adjusts the amount of current applied to a VCM used to position the actuator. In another aspect, the VCM servo control circuit feeds forward a seek expectancy signal indicative of an impending seek. Alerting the active magnetic bearing assembly of an upcoming seek operation allows the active magnetic bearing control to prospectively "brace" itself for resultant torque forces generated by the pivoting actuator arm.

These an other features and advantages which characterize the present invention will be apparent from a reading of the following detailed description and a review of the associated drawings.

BRIEF DESCRIPTION OF THE DRAWINGS

FIG. 10 is a functional block diagram of a velocity controlled seek operation illustrating the feedforward control scheme between the servo circuit and the active magnetic bearing circuit.

DETAILED DESCRIPTION

Figure 1:
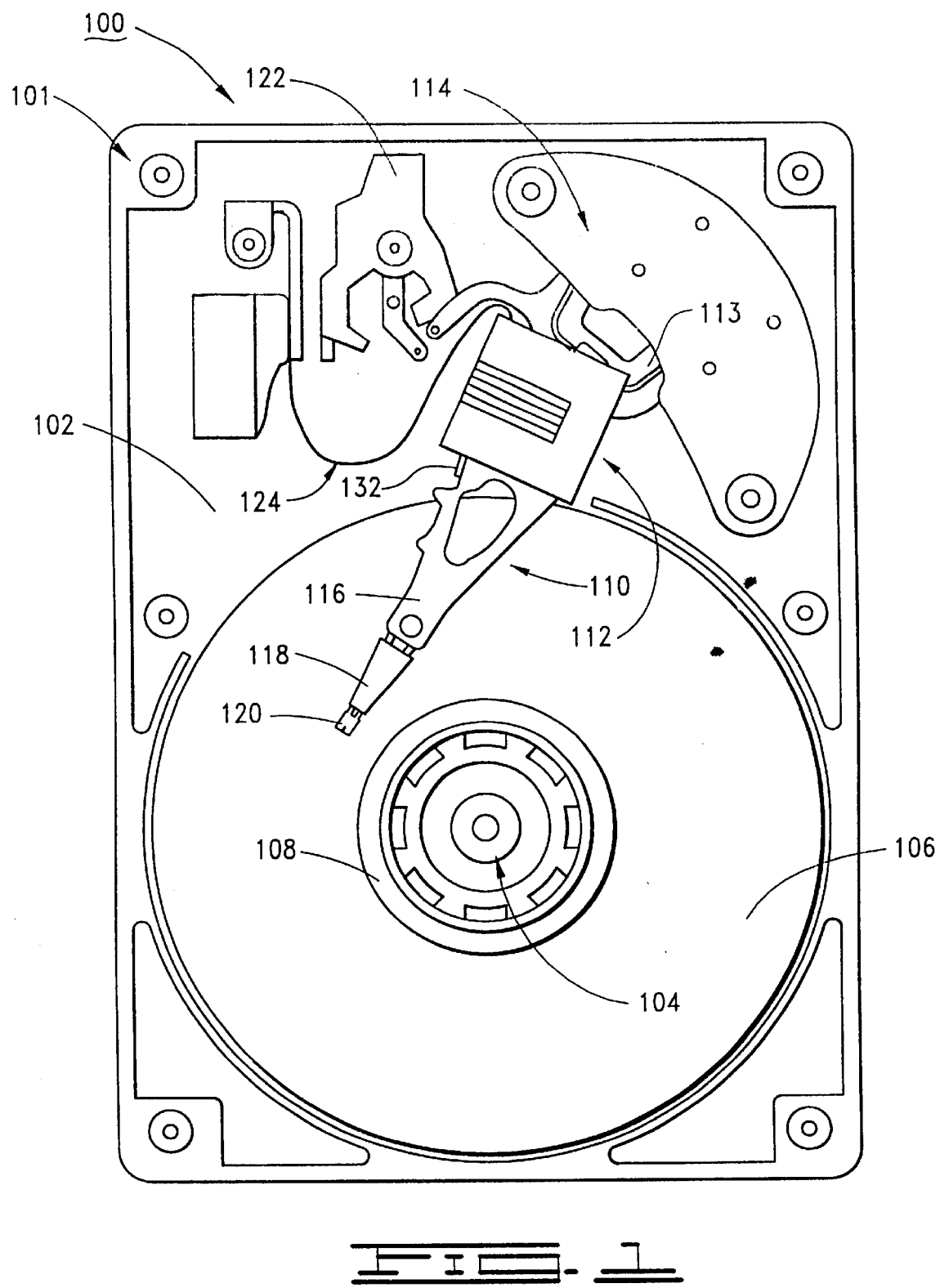
FIG. 1 is a top plan view of a disc drive constructed in accordance with a preferred embodiment of the present invention.

In order to set forth a detailed description of various presently preferred embodiments of the present invention, reference is first made to FIG. 1 which shows a top plan view of a disc drive 100 used to store computer data. The disc drive 100 includes a head-disc assembly (HDA) 101 and a printed wiring assembly (PWA) supporting control electronics used by the disc drive 100. The PWA is mounted to the underside of the HDA 101 and hence, is not visible in FIG. 1.

The HDA 101 includes a base deck 102 which supports a spindle motor 104 used to rotate a plurality of discs 106 at a constant high speed. Although not shown, it will be understood that tracks are defined on each of the disc surfaces using servo data written to the disc drive 100 during manufacturing in a conventional manner. A disc clamp 108 secures the discs 106 and a series of disc spacers disposed between adjacent discs (not visible in FIG. 1) to the spindle motor 104. A top cover (not shown) mates with the base deck 102 to provide an internal environment for the HDA 101.

A rotary actuator 110 is configured for rotation about an active magnetic bearing assembly (AMBA) 112 supported by the base deck 102. Generally, the AMBA 112 operates as an active magnetic bearing cartridge which through use of controlled electromagnetic attraction three-dimensionally suspends the actuator arm within the AMBA 112. The particular components and interrelated function of the AMBA 112 will be discussed in greater detail below.

The actuator 110 is rotated through controlled application of current to an actuator coil 113 of a voice coil motor (VCM) 114. An E-block 115 comprises the central portion of the actuator 110 and serves as the mount for a plurality of actuator arms 116. The plurality of actuator arms 116 project from the E-block 115 and support flexure assemblies 118 which, in turn, support a plurality of corresponding heads 120 over the surfaces of the discs 106. A latch/stop assembly 122 secures the heads over texturized landing zones (not designated) at the inner diameters of the discs 106 when the disc drive is not in use and includes limit stops (not separately designated) to limit the radial extent (stroke) of the actuator 110. A flex circuit assembly 124 and a preamplifier/driver (preamp) 132 facilitate electrical communication between the actuator 110 and the disc drive PWA.

Figure 2:
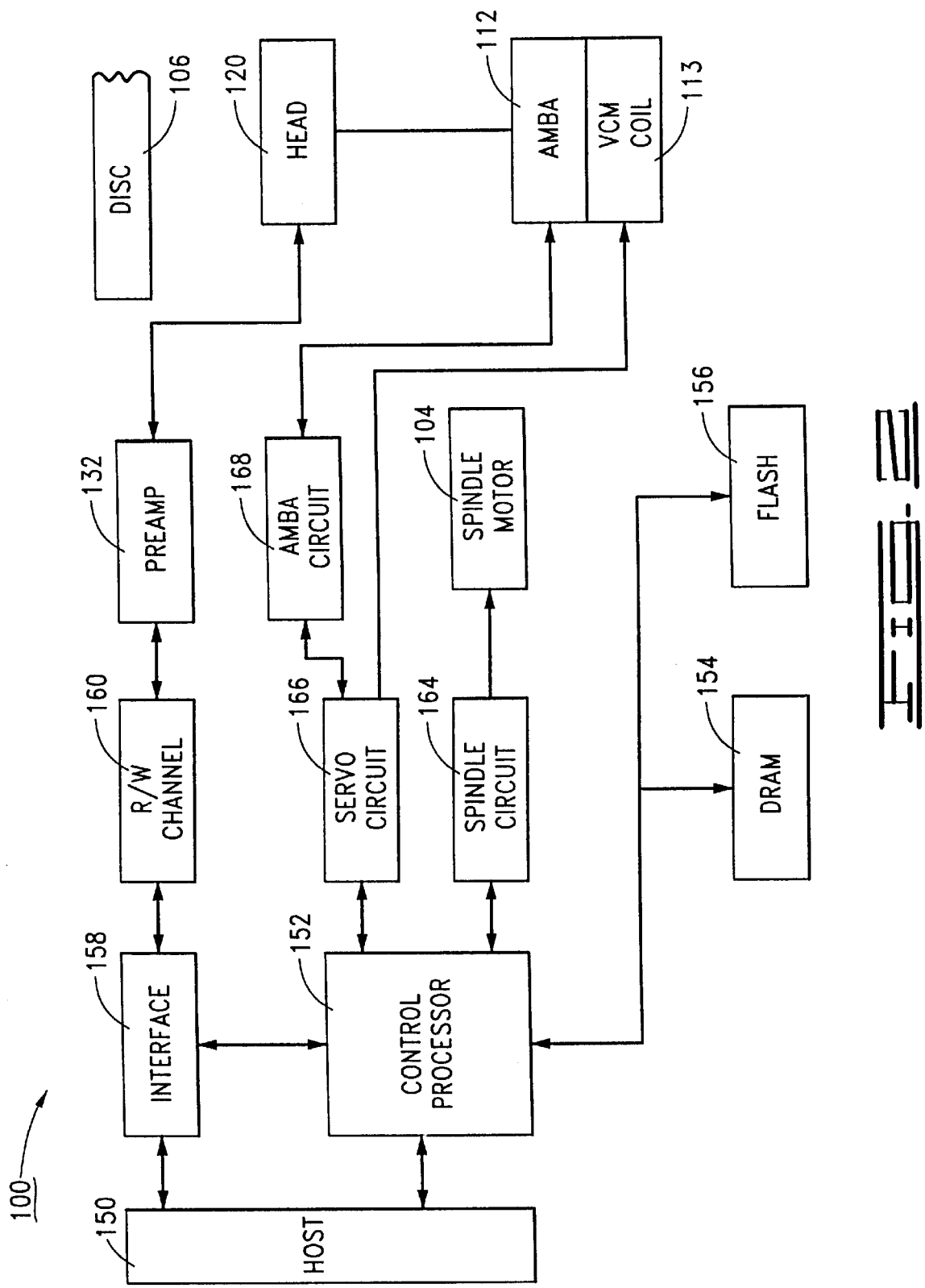
FIG. 2 is a functional block diagram of the disc drive of FIG. 1.

Turning now to FIG. 2, provided therein is a generalized functional block diagram of relevant portions of the disc drive 100 of FIG. 1, including circuitry disposed on the aforementioned disc drive PWA. The disc drive 100 is shown to be operably coupled to a host device 150 with which the disc drive 100 is associated. For example, the host device 150 can comprise a personal computer (PC) in which the disc drive is mounted.

A control processor 152 provides top level control of the operation of the disc drive 100 in accordance with programming and parameter values stored in dynamic random access memory (DRAM) 154 and flash memory 156. An interface circuit 158 includes a data buffer (not separately shown) for the temporary buffering of transferred data, and a sequence controller ("sequencer," also not separately shown) which directs the operation of a read/write channel 160 and the preamp 132 during data transfer operations. The preamp 132 is preferably mounted to the actuator 110, as shown in FIG. 1.

A spindle circuit 164 is provided to control the rotation of the discs 106 through back electromotive force (bemf) commutation of the spindle motor 104. A servo circuit 166 controls the position of the selected head 120 relative to the disc 106. An AMBA circuit 168 controls the operation of the AMBA 112. The detailed operation of the AMBA circuit 168 and the specific interrelation between the AMBA circuit 168 and the servo circuit 166 will be described in greater detail below, after a review of the construction of the AMBA 112.

Figure 3:
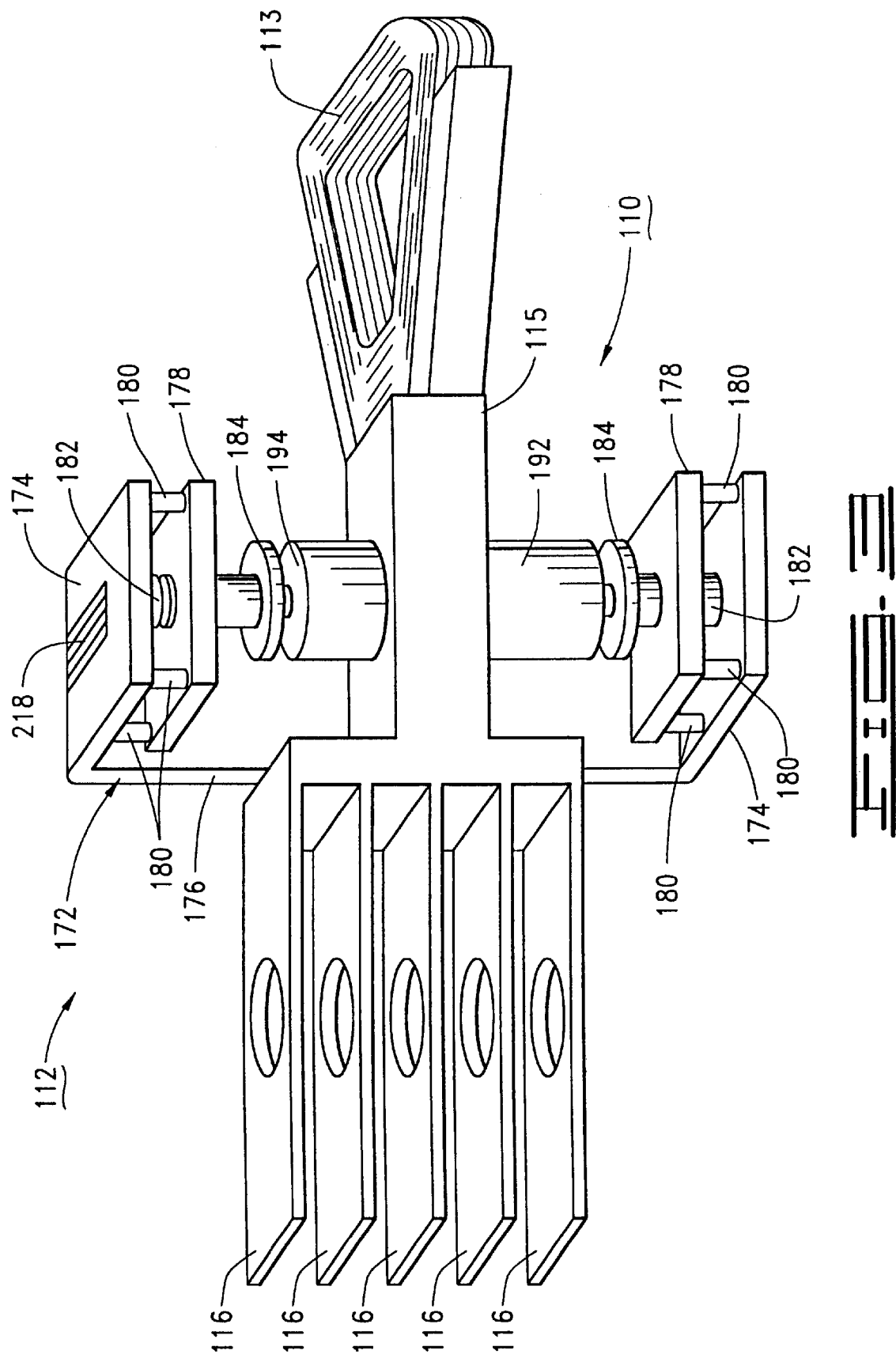
FIG. 3 is a perspective view of an active magnetic bearing assembly and actuator constructed in accordance with a preferred embodiment of the present invention.

With reference to FIG. 3, shown therein is a perspective view of the AMBA 112 constructed in accordance with a preferred embodiment of the present invention. The AMBA 112 comprises four main assemblies; a support frame assembly 172, a plurality of lateral suspension assemblies 178, a plurality of vertical suspension assemblies 182 and a plurality of sense coil assemblies 184. The support frame assembly 172 is generally characterized as a "C" shaped member having two horizontal plates 174 and a perpendicularly oriented vertical plate 176 such that the two horizontal plates 174 are substantially parallel to one another and disposed at opposite ends of the vertical plate 176. In a preferred embodiment of the present invention, the support frame assembly 172 is constructed from a magnetically conductive material thereby providing an efficient flux path. It will be understood to one of ordinary skill in the art that the support frame assembly 172 is disposed upon the basedeck 102 such that the support frame assembly 172 does not inhibit the operation of the actuator 110. A preferred orientation of the support frame assembly 172 is illustrated in FIG. 1.

Each lateral suspension assembly 178 is located in close proximity and oriented substantially parallel to a respective horizontal plate 174 of the support frame assembly 172. The particular components of the lateral suspension assemblies 178 will be described in greater detail below with reference to FIG. 5. It should be noted that each lateral suspension assembly 178 is structurally identical to the other. The two lateral suspension assemblies 178 are held in position relative the horizontal plates 174 by a plurality of standoffs 180 disposed about the periphery of the lateral suspension assemblies 178.

FIG. 3 further shows the vertical suspension assemblies 182 to be located in the space provided by the standoffs 180 between the horizontal plates 174 of the support frame assembly 172 and the lateral suspension assemblies 178. It should be noted that each vertical suspension assembly 182 is structurally identical to the other. It will be understood that the terms "lateral" and "vertical" used to designate the particular suspension assemblies refers to the three-dimensional (X,Y,Z) geometrical axis to which their operation is directed.

The AMBA 112 further comprises two sense coil assemblies 184 which are rigidly bonded to the interior side of the respective lateral suspension assembly 178. In addition to the aforementioned components of the AMBA 112, FIG. 3 shows the individual components of the actuator 110. The actuator 110 comprises the actuator coil 113, the E-block 115, the actuator arms 116, and a shaft 192. The shaft 192 is rigidly affixed to the E-block 115 and extends substantially parallel to the vertical plate 176 of the support frame assembly 172. The shaft 192 is suspended within the lateral suspension assembly 178 so that the terminal ends of the shaft 192 are each supported in close proximity to the vertical suspension assembly 182. The shaft 192 is generally cylindrical with a change in diameter denoted as a shaft-step 194. Preferably, the shaft 192 is homogeneously constructed from a highly conductive ferromagnetic material.

Figure 4:
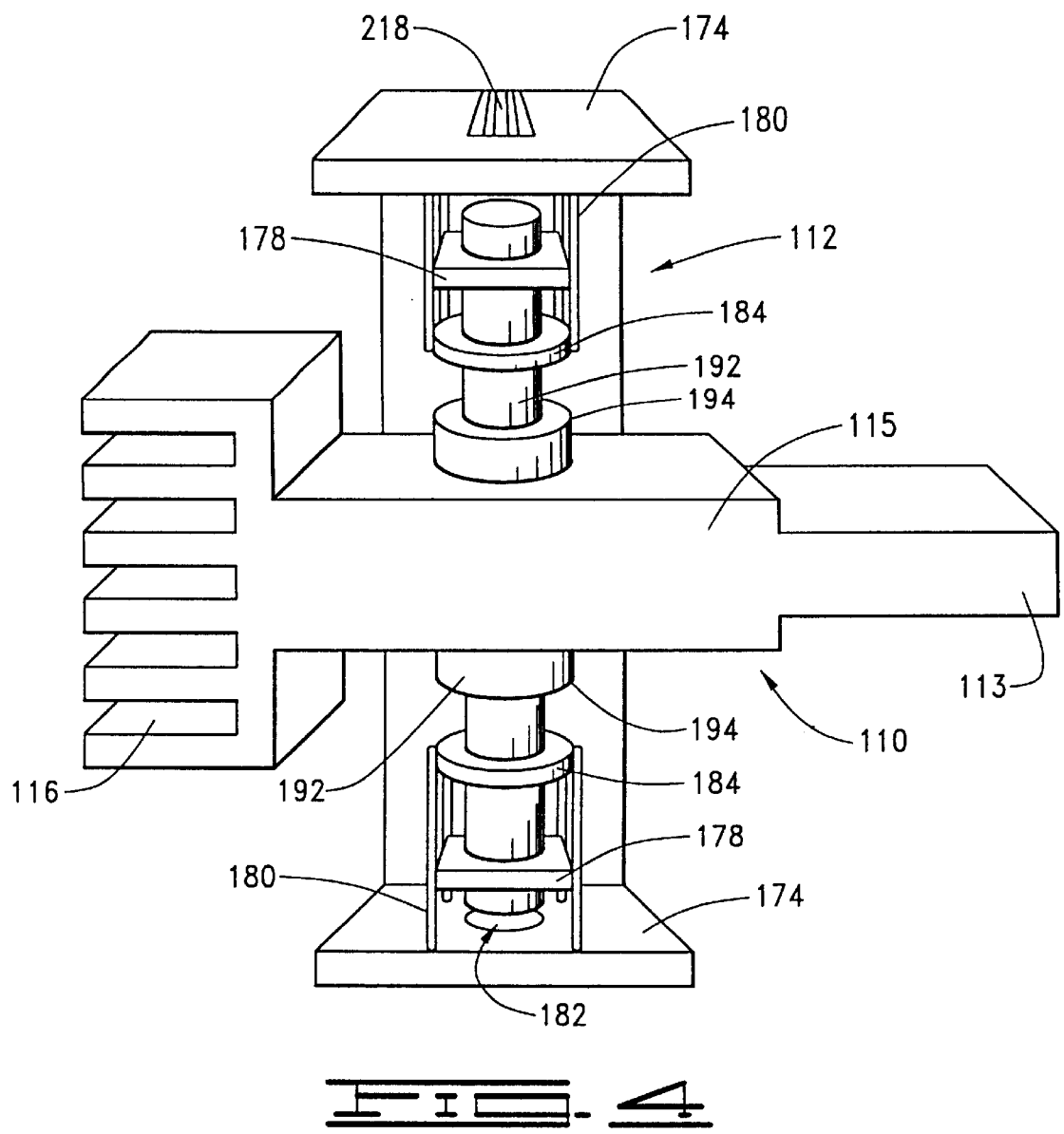
FIG. 4 is a cross section view of the active magnetic bearing assembly and actuator of FIG. 3.

Now turning to FIG. 4, shown therein is a perspective cross-sectional view of the AMBA 112 and selected components of the actuator 110. From FIG. 4, it can be seen that the shaft 192 extends continuously through the E-block 115. FIG. 4 also provides illustrates the relative placement of the sense coil assemblies 184 and the lateral suspension assemblies 178. It should be noted that the representation of the distance between the sense coil assemblies 184 and the lateral suspension assemblies 178 is exaggerated for purposes of demonstrating their position relative the shaft 192. FIG. 4 also illustrates the proximity with which the shaft-steps 194 approach the sense coil assemblies 184, and the relative positioning of the terminal ends of the shaft 192 and the vertical suspension assembly 182.

Figure 5:
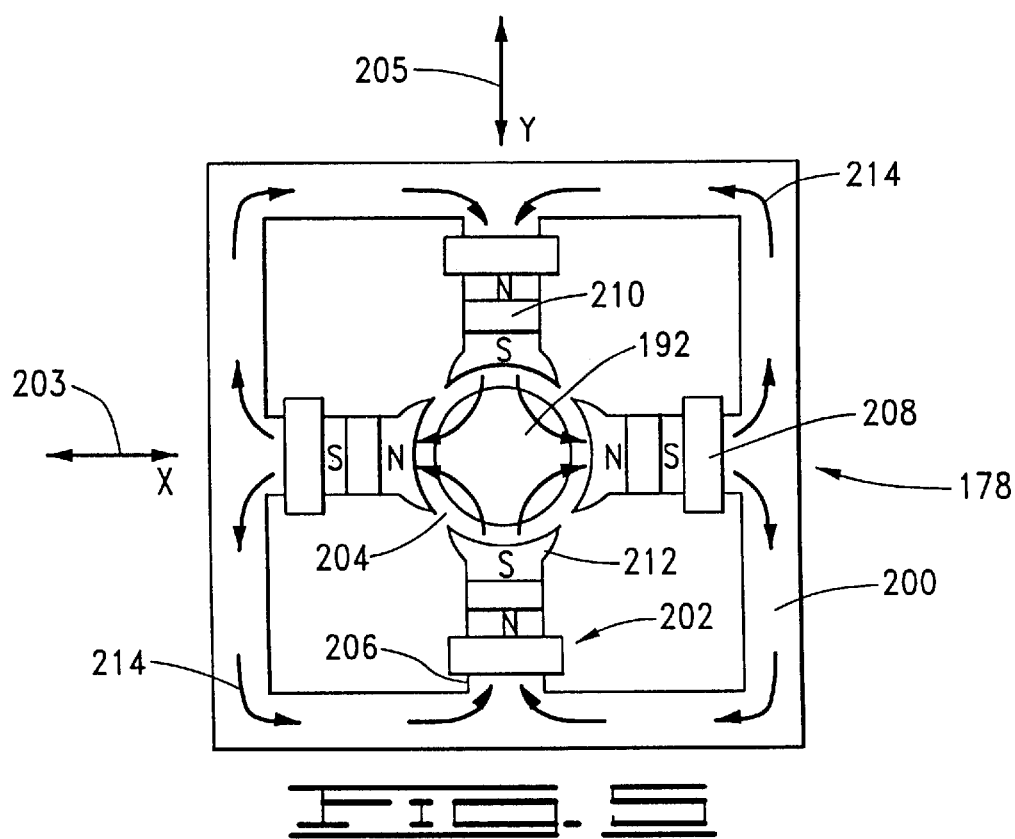
FIG. 5 is a top plan view of the lateral suspension assembly of the active magnetic bearing assembly of FIG. 3.

FIG. 5 shows a top plan view of a single lateral suspension assembly 178. It will be readily understood from FIG. 3 and FIG. 4 that, in a preferred embodiment of the present invention, there are two structurally identical lateral suspension assemblies 178. The lateral suspension assembly 178 primarily comprises a lateral flux conduit 200, a plurality of lateral electromagnet assemblies 202 and a bore 204. In a preferred embodiment of the present invention, the plurality of lateral electromagnetic assemblies 202 are equidistantly spaced about the lateral flux conduit 200 such that perimeter of the bore 204 is roughly defined by the distal ends of the lateral electromagnet assemblies 202. Preferably, the bore 204 is circular, is located in the center of the lateral flux conduit 200 and has a diameter marginally larger than the diameter of the shaft 192. A plurality of recessed areas (not separately designated) are defined by the sides of the adjacent electromagnetic assemblies 202.

In a typical embodiment, there are four individual lateral electromagnet assemblies 202. A first pair of lateral electromagnet assemblies are disposed on opposing sides of the bore 204 and control the first component (the "X" axis) of the shaft lateral displacement (such as indicated by arrow 203). A second pair of lateral electromagnet assemblies are disposed adjacent the first pair of lateral electromagnet assemblies 202 and control the second component (the "Y" axis) of the shaft lateral displacement (such as indicated by arrow 205). It will be readily understood that the specific configuration of the lateral electromagnet assemblies 202 may vary with design and that such variations are contemplated as being within the scope of the present invention.

The lateral electromagnet assemblies 202 further comprise a plurality of ferromagnetic projections ("posts") 206, driver coils 208, laterally disposed permanent magnets 210 and flux receivers 212. The projections 206 are conductively attached to the lateral flux conduit 200. The lateral flux conduit 200 is preferably fabricated from a magnetically permeable material in order to provide an efficient transfer of magnetic flux between adjacent lateral electromagnet assemblies 202. The driver coils 208 are wound about the projections 206 and connected to the AMBA circuit 168. The AMBA circuit 168 controls the application of current through the driver coils 208 and thereby generates a magnetic field of the desired magnitude. The direction that the driver coils 208 are wound around the laminated steel posts 206 is alternated between adjacent lateral electromagnet assemblies 202 to reverse the polarity of adjacent electromagnets and provide a continuous flux transfer.

With continued reference to FIG. 5, the permanent magnets 210 are oriented with alternating polarity on adjacent lateral electromagnet assemblies 202. The receivers 212 control the air gap between the shaft 192 and the permanent magnets 210, and guard the permanent magnets 210 from contact resulting from lateral shaft 192 translation. Arrows 214 illustrate the magnetic flux paths generated by the permanent magnets 210 and the driver coils 208.

Figure 6:
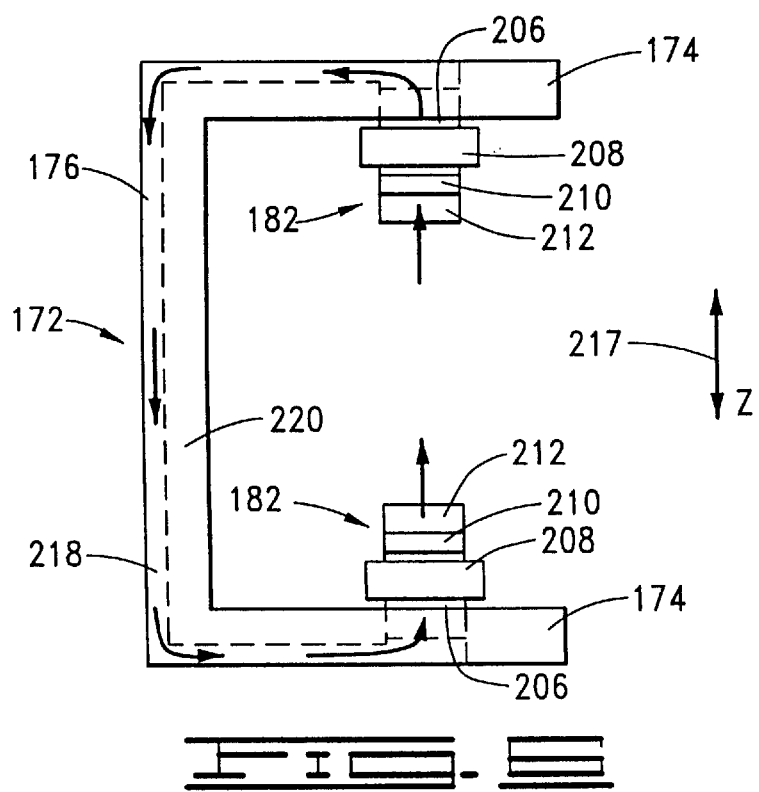
FIG. 6 is a side elevational view of the vertical suspension assembly of the active magnetic bearing assembly of FIG. 3.

Turning now to FIG. 6, shown therein are two vertical suspension assemblies 182 rigidly affixed to the two horizontal plates 174 of the support frame assembly 172 which cooperate to control shaft 192 displacement in the vertical ("Z axis") direction (denoted by arrow 217). As described above, the support frame assembly 172 is a substantially "C" shaped member with two horizontal plates 174 and a vertical plate 176. The support frame assembly 172 further comprises a C-shaped flux conduit 218 inserted into an aluminum support 220 (this configuration can also be seen in FIGS. 1, 3 and 4). The flux conduit 218 preferably comprises a plurality of laminated steel members to provide an efficient magnetic flux path, as shown.

As with FIG. 5, the assembly of FIG. 6 includes projections 206, driver coils 208, permanent magnets 210 and receivers 212. Each receiver 212 is attached to the corresponding permanent magnet 210 and aids in flux transfer while protecting the vertical suspension assembly 182 from vertical displacement of the shaft 192. It will be understood that the particular shape of the open face of the receiver 212 will be milled to match the corresponding distal end of the shaft 192.

Figure 7:
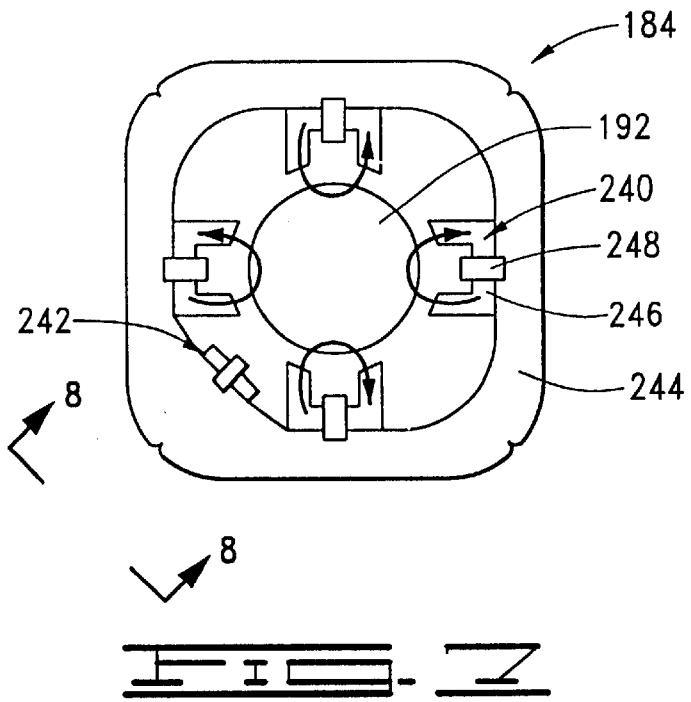
FIG. 7 is a top plan view of the sense coil assembly of the active magnetic bearing assembly of FIG. 3.

Now referring to FIG. 7, shown therein is a top plan view of one of the sense coil assemblies 184. From FIGS. 3 and 4 it will be recalled that there are two structurally identical sense coil assemblies 184 which are disposed on opposite sides of the rotor assembly 190 and in close proximity with the shaft 192 and shaft-step 194. Each sense coil assembly 184 comprises a plurality of lateral sensor assemblies 240, a vertical sensor assembly 242 and a support ring 244. In a preferred embodiment of the present invention, the sense coil assembly has four lateral sensor assemblies 240 which are equidistantly disposed about the interior circumference of the support ring 244. The support ring 244 may be fabricated from a molded polymer suitable for mounting the lateral sensor assemblies 240 and vertical sensor assembly 242.

Each lateral sensor assembly 242 comprises a ferrite post 246 and a sense coil 248. The ferrite post 246 is substantially "U" shaped and is positioned such that the terminal ends of the ferrite post 246 are in close proximity with the ferromagnetic shaft 192. The sense coil 248 is fabricated from a conductive material, such as copper, and is tightly wound around the ferrite post 246. The sense coil 248 has leads (not separately shown) which are connected to the AMBA circuit 168.

Continuing with FIG. 7, the function of the sense coil assembly 184 is premised on fundamental electromagnetic principles. When a lateral displacement in the shaft 192 occurs, the shaft moves closer to at least one lateral sensor assembly 240. The displacement of the shaft 192 towards the lateral sensor assembly 240 generates a signal in the lateral sensor assembly 240 which is transmitted to the AMBA circuit 168 for processing via the sense coil 248. The processing of the signal from the sense coil assembly 184 will be discussed in greater detail below.

Figure 8:
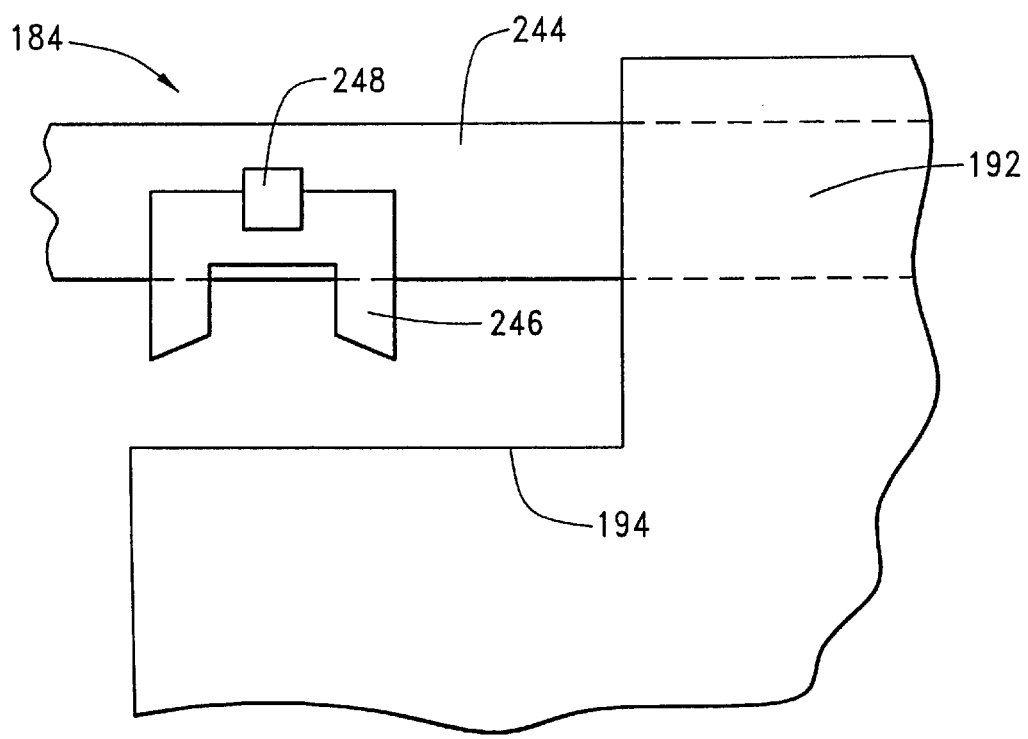
FIG. 8 is a cutaway side view of the interior of the sense coil assembly from FIG. 7.

FIG. 8 a side view of the sense coil assembly 184 of FIG. 7 along view 8—8, illustrating a vertical sensor assembly 242 attached to the interior circumference of the support ring 244. It should be noted that the individual components of vertical sensor assembly 242 preferably are identical in form, arrangement and numerical designation to those of the lateral sensor assemblies 240. The vertical sensor assembly 242 is oriented such that the terminal ends of the ferrite posts 246 are placed in close proximity with the shaft-step 194. Like the lateral sensor assemblies 240, the vertical sensor assembly 242 detects a change in the position of the shaft-step 194 relative the vertical sensor assembly 242. More specifically, during a vertical translation, the shaft-step 194 causes a signal to be generated in the sense coil 248 of the vertical sensor assembly 242. The representative signal is then output from the sense coil 248 to the AMBA circuit 168 for processing. The interrelated function of the sense coil assemblies 184, the lateral suspension assemblies 178 and vertical suspension assemblies 182 and the AMBA circuit 168 will now be further explained with reference to FIG. 9.

Figure 9:
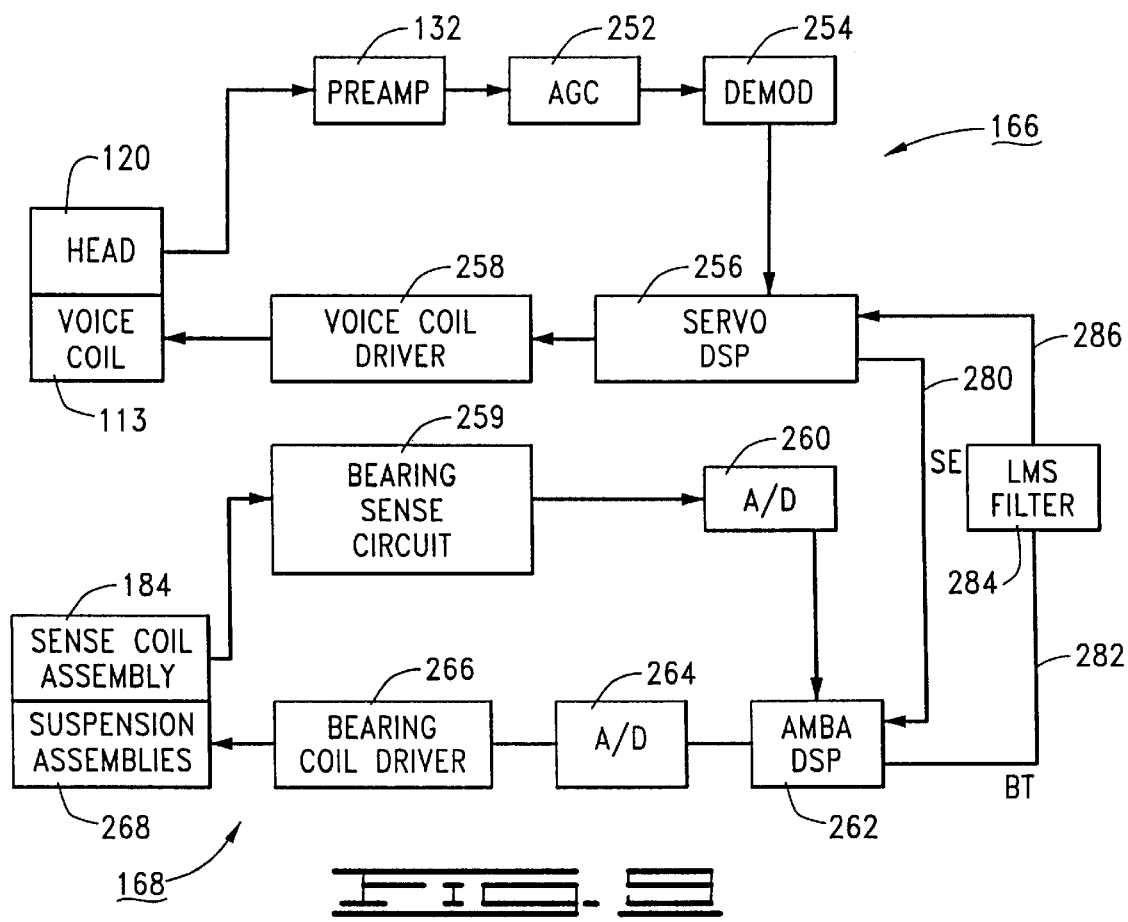
FIG. 9 is a functional block diagram of the servo circuit and active magnetic bearing circuit of FIG. 2.

Turning to FIG. 9, shown therein is a functional block diagram for the AMBA circuit 168 and the servo circuit 166 of FIG. 3. Servo data are transduced by a selected head 120 to generate a readback signal which is amplified by the preamp 132. The amplified readback signal next undergoes an amplitude normalization function by an automatic gain control (AGC) circuit 252, which adjusts the amplitude range of the readback signal to a range suitable for remaining portions of the servo circuit 166.

The readback signal is next provided to a demodulator circuit (demod) 254, which decodes and conditions the servo data to provide digital inputs to a servo digital signal processor (servo DSP) 256. The servo DSP 256 receives top level instructions from the disc drive control processor 152 and performs seeks and track following operations using programming stored in servo DSP memory (not separately shown). The disc drive control processor 152 uses top level programming to control the overall operation of the disc drive 100, including the transfer of data between the heads 120 and the host computer 150 (FIG. 3) in which the disc drive 100 is mounted.

The servo DSP 256 outputs a series of current command signals to a coil driver circuit 258, which applies current to the coil 113, thereby adjusting the radial position of the selected head 120.

Control of the AMBA 112 by the AMBA circuit 168 begins with a signal output from the sense coil assembly 184. As previously mentioned, the sense coil assemblies 184 detect vertical and lateral displacement of the shaft 192 within the bore 206. It will be noted that the sense coil assemblies 184 also detect shaft 192 translations having both vertical and lateral components.

Upon a detection of translation by the sense coil assembly 184, a sense signal is output by the sense coils 242 and is received by a bearing sense circuit 259. The bearing sense circuit 259 amplifies and outputs the sense signal to an analog-to-digital converter (A/D) 260 which conditions the sense signal for digital operation by the AMBA DSP 262.

In a preferred embodiment of the present invention, the servo DSP 256 and the AMBA DSP 262 are contained within a single device that is dedicated to performing both servo and AMBA commands. Alternatively, separate DSP modules can be provided to carry out the respective servo and AMBA functions. Thus, the servo DSP 256 and AMBA DSP 262 modules in FIG. 9 can represent a single device, or can represent two different devices.

The AMBA DSP 262 receives the digitized sense signal and computes a corresponding corrective signal based upon the magnitude and direction of the detected shaft 192 translation. The digital corrective signal is converted to an analog signal by an A/D 264 and sent to a bearing coil driver circuit 266. The bearing coil driver circuit 266 converts the corrective signal to a driver current which is applied to the lateral suspension assembly 178 and vertical suspension assembly 182; collectively represented by block 268. The corrective current applied to the electromagnet assemblies 202 creates a resultant force in a direction opposite to the shaft 192 translation thereby centering the shaft 192 within the bore 206.

The underlying circuitry of the closed-loop control embodied by the AMBA circuit 168 is well known in the art of active magnetic bearings. The closed-loop control must be robust enough to create a meta-stable, rigid suspension of the shaft 192 within the bore 206. For a more detailed description of the underlying electronics of active magnetic bearing control, see *Magnetic Bearing Systems Operate in Harsh Environments, Monitor Machinery Health*, by Ronald Kipp and Dr. Joseph Imlach (PCIM, November 1992).

As an additional consideration, the driver current sent by the bearing coil driver 260 must be sufficiently strong to counter the maximum "negative-spring" effect exhibited by the permanent magnets 210. In other words, as the shaft 192 displaces, the attraction between the permanent magnets 210 and the shaft 192 increases as their separating distance decreases. Therefore, the pull from the electromagnet assemblies 202 must be at least as strong as the maximum "negative-spring" effect produced by the permanent magnets 210. As an example, during disc drive power-down, the shaft 192 will come to rest against one or two sets of permanent magnets 210. In this position, there will be no air gap between the shaft and the laminated steel receivers 212 and the flux transfer from the permanent magnets 210 through the shaft 192 will be greatest. Therefore, the power output by the bearing coil driver 260 must be sufficiently strong when applied to an opposing electromagnetic assembly 202 to pull the shaft 192 from its resting position.

Continuing with FIG. 9, the servo DSP 256 and AMBA DSP 262 also serve as a feedforward communicators between the servo circuit 166 and the AMBA circuit 168. In a first aspect, the servo DSP 256 improves the AMBA 112 suspension by feeding forward a signal from the servo circuit 166 representative of an impending seek. During a seek operation, the actuator arm 110 pivots rapidly about the shaft 192 and produces offsetting forces which are realized in the suspended shaft 192. To counter these forces, a seek-expectancy (SE) signal is output from the servo DSP 256 and follows signal path 280 to the AMBA DSP 262. At the initiation of a seek routine, the servo DSP 256 outputs the SE signal which alerts the AMBA DSP 262 of an upcoming seek.

In a preferred embodiment of the present invention, the SE signal not only provides the AMBA circuit 168 with notice of an upcoming seek, but also the direction and the magnitude of the seek. By feeding forward a signal representative of the translational forces generated by a seek, the AMBA circuit 168 is able to decrease its response time and improve its corrective operations. The cooperative use of the SE signal is described in greater detail below with reference to FIG. 10.

In a second aspect, the AMBA circuit 168 improves servo control of the heads 120 by feeding forward a bearing translation (BT) signal to the servo circuit 166. As aerial densities increase, the demands for high precision head 120 positioning becomes more important. Any translation or vibration in the shaft 192 causes a secondary movement in the actuator 110 (including the heads 120) and adversely affects servo circuit 166 track following and seek operations.

The disturbance measurement from the AMBA 112 is a complex product of three dimensional bearing translation, radial and vertical displacement of the actuator 110 and the underlying geometry of the AMBA 112 and actuator 110. As such, the BT signal is output from the AMBA DSP 262 along path 282 and is received by an adaptive LMS filter 284. The adaptive LMS filter 284 is a familiar method for quickly approximating complex disturbances through use of a transfer function with variable coefficients driven by a common LMS algorithm.

Figure 11:
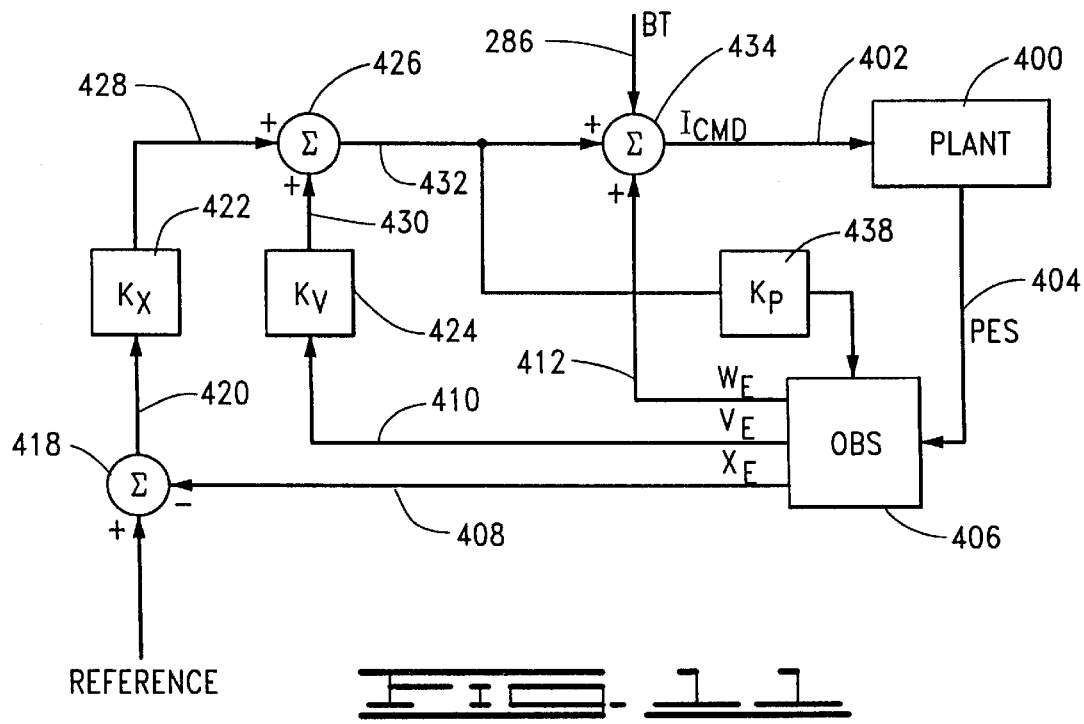
FIG. 11 is a functional block diagram of a position controlled operation illustrating the feedforward control scheme between the servo circuit and the active magnetic bearing circuit.

The filtered output of the adaptive LMS filter 284 follows signal path 286 to the servo DSP 256 where it can be readily used to improve seek and track following operations. The use of the filtered BT signal in the servo circuit 166 will now be described in detail with reference to seek operations (FIG. 10) and track following operations (FIG. 11).

Turning now to FIG. 10, shown therein is a functional block diagram representing the programming of the servo DSP 256 to carry out velocity controlled seeks. Initially, FIG. 10 shows a plant block 300, representative of electrical and mechanical portions of the disc drive 100 including the VCM 114, the head 120 and the preamp 132. An observer 302, configured to provide a mathematical model of the operation of the plant 300, outputs estimates of head position, velocity and bias ($X_E$, $V_E$ and $W_E$) on respective paths 204, 206 and 208. Bias is representative of forces that tend to move the head 120 off-track, such as windage effects from the air currents established by the rotation of the discs 106 and spring forces from the flex circuit 124. Bias will often be position dependent.

During a seek, the number of tracks to go is input on path 310 to a profiler 312. As discussed above, the tracks to go is the physical distance remaining in the seek and is determined in relation to the difference between the position of the head 120 and the location of the destination track. In response, the profiler outputs the appropriate demand velocity on path 314 through, for example, interpolation techniques or from values stored in a look-up table. The difference between the demand velocity and the estimated velocity $V_E$ is determined using summing junction 316. This difference, velocity error, is provided to gain block 318 having gain $K_{AL}$ to carry out an acceleration limiting function. The output passes through a notch filter 320 and is summed at summing junction 322 with the BT signal outputted by the LMS adaptive filter 284 (not shown in FIG. 10) along path 286. At the same time, the destination track location is provided on input path 326 to a bias prediction block 328, which predicts an amount of bias which is summed with the estimated bias at summing junction 330. The output on path 332 is summed at the summing junction 322, as well as a second summing junction 334, to be discussed shortly.

The output of the summing junction 322 is provided to a gain block 336 having gain $K_T$, used to compensate for nonlinear torque characteristics of the VCM 114. The output is summed at summing junction 338 with a current null signal on path 340, used to null out current. The resulting signal on path 342 comprises a current demand signal which is provided to the plant 300 to adjust the position of the selected head 120.

The current demand signal also serves as the seek expectancy (SE) signal which is sent to the AMBA DSP 262 along path 280. The SE signal is indicative of the direction and magnitude of current being applied to the plant during a seek operation. As previously discussed, the AMBA DSP 262 receives the SE signal and prospectively adjusts the AMBA 112 control in anticipation of the impending seek.

In response, the plant provides a sense output on path 344; servo data are provided to a demodulation (demod) block 346 and current level is provided to summing junction 348. After demodulation, the servo data are linearized using linearization block 350 to give a position sample $X_{SAMP}$ on path 352, which is differenced at summing junction 354 with the position estimate $X_E$ to provide an observer error $O_{ERR}$ on path 356. In this manner, the operation of the observer 302 is maintained nominally that of the plant 300.

The current input to the summing junction 348 is used for saturation compensation and is accordingly summed with a saturation null input from path 358. Gain block 360 applies a saturation gain $K_{SAT}$ and the output is differenced with the bias sum from path 332. Finite response filter (FIR) block 362 provides the desired time delay to the output of the notch filter 320, so that the observer 302 receives a switched input from either the FIR 362 or the saturation loop, depending upon whether the coil is in saturation.

Accordingly, when large changes in current are applied to the VCM coil 113 during a seek to quickly accelerate and decelerate the head 120, provision of the SE signal to the AMBA DSP 262 enables the AMBA circuit 168 to compensate for the resulting changes in translational force upon the actuator 110. Although the embodiment of the FIG. 10 contemplates use of the current command signal as the SE signal, other signals can be used or desired to form the SE signal, such as the velocity error output by the summing junction 316.

Now turning to FIG. 11, shown therein is a functional block diagram of the programming of the servo DSP 256 during a position controlled, or track following operation. A plant block 400 is presented representative of selected electrical and mechanical aspects of the disc drive 100. For reference, the plant 400 generally includes portions of the primary loop established by the servo circuit 166 (see FIG. 9). The plant block 400 receives as an input a current command ($I_{CMD}$) signal on path 402 and, in response, outputs a position error signal (PES) on path 404 indicative of positional error in the selected head 120.

FIG. 11 further shows an observer (OBS) block 406, which generally provides a mathematical model of the plant 400 and periodically outputs estimates of head position ($X_E$), velocity ($V_E$) and bias ($W_E$) on paths 408, 410 and 412, respectively (similar to the observer 302 in FIG. 10). As before, bias will be understood as indicative of forces that tend to move the heads away from a selected position, such as spring forces applied by the flex circuit 124 (FIG. 1) and windage effects caused by air currents set up by the rotation of the discs 106.

The $X_E$ on path 408 is summed at a summing junction 418 with a reference position (indicative of desired head position) and the output on path 420 is applied to a position gain block 422 having gain $K_x$. The $V_E$ on path 410 is similarly applied to a velocity gain block 424 having gain $K_v$. The outputs of the position and velocity gain blocks 422, 424 are brought to a summing junction 426 by way of paths 428, 430, respectively. The output (on path 432) is summed at a summing junction 434 with the $W_E$ from path 412 and the filtered BT signal (FIG. 9) to generate the $I_{CMD}$ signal on path 402.

Because position controlled operations are used during precise track following operations, the weight of the BT signal is significant. The output on path 432 is further applied to gain block 438 and fed to the observer 406. It will be noted that the sign designation for the various inputs to the summing junctions 418, 426 and 434 have been generally arbitrarily assigned and could be modified with corresponding changes in polarity of the respective signals.

Accordingly, during disc drive operation the BT signal is generated on a steady-state basis and provided to the servo circuit 166 to minimize the effects of AMBA 112 translation upon the disc drive 100 during track following. Unlike the velocity controlled seek operation referenced in FIG. 10, there are no outputs from the position controlled operation to the AMBA DSP 262, as it is contemplated that the relatively small movements of the actuator arm during track following will be insufficient to disturb the substantially rigid suspension of the AMBA 112. However, in an alternate preferred embodiment of the present invention, the $I_{CMD}$ signal (or other suitable signal, such as position error) is used in a feedforward scheme to form the SE signal, as discussed above.

To further explain the interrelated operation of the AMBA circuit 168 and the servo circuit 166, FIG. 11 shows an AMBA TO SERVO routine 450, setting forth the steps performed by each circuit during a feedforward operation.

At step 452, the sense coil assemblies 184 detect a shaft 192 translation within the AMBA 112. It will be recognized that the translation of the shaft 192 within the AMBA 112 may be caused by a number of events which may include offsetting forces produced by movement of the actuator 110 and externally applied shock to the disc drive 100.

Upon a detection of disturbance by the sense coil assemblies 184, a sense signal is output by the sense coils 242 and is received by a bearing sense circuit 259. At step 454 the bearing sense circuit 259 determines the magnitude and direction of the shaft 192 translation. The bearing sense circuit 259 passes the translation signal to the AMBA DSP 262 for additional processing.

At step 456, the AMBA DSP 262 operates to output a bearing translation (BT) signal to an adaptive least mean squares (LMS) filter 284 illustrated by step 458. Using adaptive algorithms and transfer functions with variable coefficients, the adaptive LMS filter 284 calculates an adjusted BT signal based upon a number of immeasurable disturbances. For example, the adaptive LMS filter 284 takes into consideration the dynamic radial position of the heads 120 and the underlying geometry of the AMBA 112 and actuator 110.

At step 460, the adaptive LMS filter 284 outputs a filtered BT signal which is a proportional representation of the shaft 192 translation within the AMBA 112. Next, at step 462, the servo circuit 166 receives the filtered BT signal and applies a compensated current to the coil 113 of the VCM 114. The AMBA TO SERVO routine 450 provides an effective method for improving servo control through the feedforward use of a signal indicative of a translational disturbance within the AMBA 112.

Figure 12:
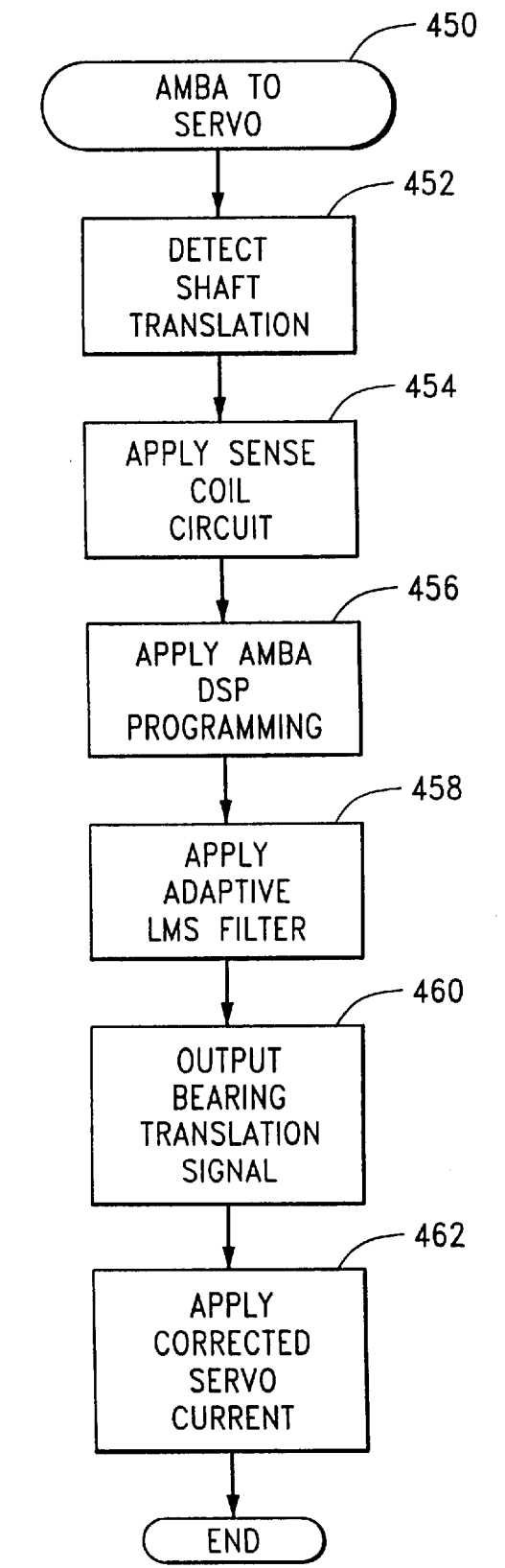
FIG. 12 provides a flow chart for an AMBA TO SERVO routine to show interrelated operation of the servo circuit and the active magnetic bearing circuit of FIG. 9.
Figure 13:
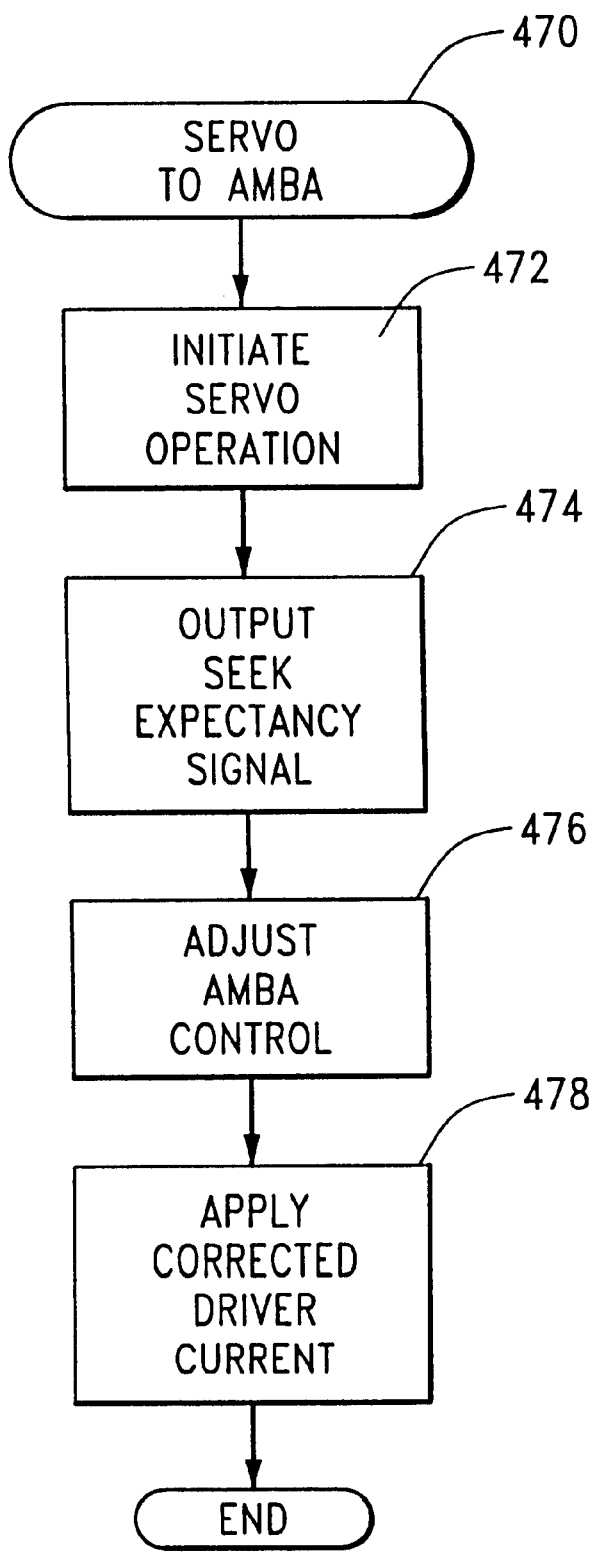
FIG. 13 provides a flow chart for a SERVO TO AMBA routine to further show interrelated operation of the servo circuit and the active magnetic bearing circuit of FIG. 9.

FIG. 12 shows a SERVO TO AMBA routine 470, setting forth the steps performed by the servo circuit 166 and AMBA circuit 168 in a preferred embodiment.

At step 472, the servo circuit 166 initiates a servo operation. Typically, the servo operation is either a seek or track following operation. In a seek operation, the servo circuit 166 applies current to the VCM 114 to controllably move the heads 120 from a first radial position to a second radial position. In a track following operation, the servo circuit 166 may be involved in applying current to the VCM 114 in order to position the heads 120 at a constant radial position.

At step 474, the servo circuit 166 outputs a seek expectancy (SE) signal representative on an impending seek operation. It will be noted that in certain embodiments, it may be desirable for the SE signal to be representative of both seek and track following operations. The SE signal may be based on any number of signals generated by the servo circuit 166 and may include portions of signals indicative of; command current, velocity error, or position error.

Next, at step 476, the AMBA DSP 262 receives the SE signal and calculates a corrective signal which is output to the bearing coil driver 266. Step 478 illustrates the operation of the bearing coil driver 266 applying a corrected current signal to the suspension assemblies 268. The SERVO TO AMBA routine 470 provides a method for improving the three-dimensional suspension of the shaft 192 within the AMBA 112 by factoring servo circuit 166 operations into the control of the AMBA 112.

From the foregoing discussion, it will be clearly understood that the present invention is directed to a stable active magnetic bearing assembly and methods for improving servo control and active magnetic bearing suspension. As exemplified by presently preferred embodiments, a disc drive 100 includes a rotary actuator 110 supporting a head 120 adjacent a rotatable disc 106 and an actuator coil 113 immersed in a magnetic field of a voice coil motor 114.

An active magnetic bearing assembly (AMBA) 112 is used to pivot the actuator 110 and generally comprises a support frame assembly 172, a lateral suspension assembly 178, a vertical suspension assembly 182, a ferromagnetic shaft 192 and a plurality of sense coil assemblies 184. An AMBA circuit 168 controls the three dimensional suspension of the shaft 192 and provides a feedforward bearing translation (BT) signal to a servo circuit 166 for optimized disc drive performance. The servo circuit 166 applies current to the actuator coil to position the head relative to the disc recording surface in relation to servo information transduced by the head, as well as in relation to the BT signal. The servo circuit 166 also feeds forward a seek expectancy (SE) signal to the AMBA circuit 168 representative of an impending seek operation. The SE signal allows the AMBA circuit 168 to prospectively guard against disturbance caused by the seek operation.

For purposes of the appended claims, the terms "circuit" and "block" will be understood to be realize in either hardware or software, in accordance with the foregoing discussion. The phrase "host device" will be understood to describe any device which communicates with the claimed disc drive, such as, but not limited to, the personal computer discussed above. Although method steps have been set forth in a particular order, such ordering is not necessarily limiting to the scope of the claims.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A disc drive comprising:
   a recordable disc upon which a plurality of tracks are radially defined;
   a moveable actuator which supports a transducer adjacent the disc;
   a stationary active magnetic bearing assembly adjacent the actuator comprising a plurality of bearing coils configured to levitate the actuator along first, second and third orthogonal axes so that the actuator rotates about the first axis to move the transducer in a plane defined by the second and third axes;
   an active magnetic bearing control circuit, coupled to the active magnetic bearing assembly, which applies currents to the bearing coils to levitate the actuator;
   an actuator motor coupled to the actuator; and
   a servo control circuit which applies current to the actuator motor to position the transducer in relation to servo signals generated as the transducer reads servo data stored on the disc.

2. The disc drive of claim 1, wherein the servo control circuit is configured to carry out a seek operation by applying seek current to the actuator motor to move the transducer from an initial track to a destination track on the disc, wherein the servo control circuit outputs a seek expectancy signal to the active magnetic bearing control circuit at the beginning of a seek operation, and wherein the active magnetic bearing control circuit adjusts the currents applied to the bearing coils in response to the seek expectancy signal to compensate for torque forces induced in the actuator as the seek current is applied to the actuator motor.

3. The disc drive of claim 2, wherein the seek expectancy signal provides an indication of polarity and magnitude of the seek current.

4. The disc drive of claim 1, wherein the active magnetic bearing assembly further comprises a sense coil assembly which outputs a disturbance signal indicative of a disturbance within the active magnetic bearing assembly, and wherein the servo control circuit compensates for the disturbance by adjusting the current applied to the actuator motor in relation to the disturbance signal.

5. The disc drive of claim 4, wherein the disturbance comprises an externally generated mechanical shock applied to the disc drive, and wherein the adjusted current applied to the actuator motor reduces position error in the transducer induced by the mechanical shock.

6. The disc drive of claim 1, wherein the actuator comprises a ferromagnetic shaft which is aligned along the first axis, and wherein the bearing coils magnetically interact with the shaft to levitate the actuator.

7. A bearing cartridge assembly for use in a disc drive, comprising:
   a rotatable actuator which supports a transducer;
   an active magnetic bearing assembly adjacent the actuator comprising:
      a plurality of bearing coils configured to levitate the actuator in three orthogonal axes; and
      a plurality of sense coil assemblies adjacent the actuator which detect displacement of the actuator relative to the active magnetic bearing assembly; and
   an active magnetic bearing control circuit which applies currents to the bearing coils to levitate the actuator, wherein the active magnetic bearing circuit adjusts the currents applied to the bearing coils to compensate for the displacement of the actuator as detected by the sense coil assemblies.

8. The bearing cartridge assembly of claim 7, wherein the active magnetic bearing control circuit is configured to feed forward a signal representative of the displacement of the actuator to a servo control circuit of the disc drive used to control the position of the transducer with respect to a disc of the disc drive.

9. The bearing cartridge assembly of claim 8, wherein the active magnetic bearing control circuit comprises a filter which filters the signal representative of the displacement of the actuator using an adaptive least mean squares (LMS) methodology.

10. In a disc drive having a rotatable disc on which a plurality of tracks are defined, a rotatable actuator which supports a head adjacent the disc, an actuator motor which rotates the actuator, an active magnetic bearing assembly which levitates the actuator in three orthogonal axes and a plurality of sense coil assemblies which detect a disturbance in the actuator in relation to displacement of the actuator with respect to the sense coil assemblies, a method for controlling position of the head with respect to the disc, comprising steps of:

(a) generating a base current command signal indicative of current to be applied to the actuator motor to position the head in a desired relation to the disc;

(b) using the sense coil assemblies to generate a disturbance signal having polarity and magnitude indicative of a disturbance in the actuator;

(c) combining the base current command signal and the disturbance signal to generate a modified current command signal; and (d) applying current to the actuator motor in response to the modified current command signal to position the head with respect to the disc.

11. The method of claim 10, wherein the disc drive further comprises actuator motor driver circuitry, and wherein applying step (d) comprises a step of providing the modified current command signal to the actuator motor driver circuitry which, in response, applies current to the actuator motor to position the head with respect to the disc.

12. The method of claim 11, wherein the active magnetic bearing assembly comprises a plurality of bearing coils which cooperate to levitate the actuator in response to bearing currents, and wherein the method further comprises a step of:

(e) using the modified current command signal to adjust the bearing currents to compensate for torque forces induced in the actuator as the motor driver circuitry applies current to the actuator motor.

13. The method of claim 10, wherein the base current command signal is generated during a seek operation to move the head from an initial track to a destination track on the disc in accordance with a velocity profile scaled in proportion to the distance between the initial track and the destination track.

14. The method of claim 10, wherein the base current command signal is generated during a track following operation in relation to a position error representative of a distance between the head and a desired track.

15. The method of claim 10, wherein the disturbance comprises an externally applied mechanical shock.

\* \* \* \* \*